Patented Feb. 17, 1942

2,273,459

UNITED STATES PATENT OFFICE 2,273,459

PURIFICATION OF ACETIC ACID

Edgar C. Britton, Ralph P. Perkins, and Andrew J. Dietzler, Midland, Mich., assignors to The Dow Chemical Company, Midland, Mich., a corporation of Michigan No Drawing. Application November 25, 1938, Serial No. 242,278

7 Claims. (Cl. 260—541)

This invention concerns a method of purifying acetic acid of natural origin, i. e. acetic acid produced by distillation of wood, fermentation of fruit juices, etc. It particularly concerns the removal of difficulty separable impurities which give an off-odor to acetic acid from such source.

Acetic acid from a natural source is often contaminated with alcohols, esters, mono- and diketones, tars, and many other impurities of unknown identity. For instance, aqueous acetic acid produced by destructive distillation of wood usually contains other aliphatic acids, such as formic and propionic acids, various alcohols, such as methanol, ethanol, etc., esters, wood tars, and a variety of other impurities. Such crude acid may be partially purified by the well known lime purification or by extraction with selective solvents followed by rectification but the acid obtained from these known processes usually retains a small proportion of undesirable impurities. Further purification may be accomplished by treating the acid with a strong oxidizing agent as disclosed in U. S. Patents Nos. 96,721, 100,553, 414,277, or 1,210,792 to destroy impurities which tend to form tars on standing or it may be treated with ammonia in accordance with the method set forth in U. S. Patent No. 2,126,611 to remove similar impurities. Natural anhydrous acetic acid which has been subjected to such known purification operations and rectified is often obtained in a form having physical constants closely approximating those of the pure acid, but even though substantially pure the acid usually retains traces of impurities which give it a characteristic off-odor distinct from that of pure acetic acid. The odor of such purified natural acetic acid indicates that it may contain traces of esters, but there is also a rank odor to the acid which indicates the presence of other impurities whose identity is not known. An object of the present invention is to provide a simple and economical method for purifying and/or decolorizing natural acetic acid, particularly for removing the impurities which give it an off-odor.

We have discovered that the impurities of a natural acetic acid, which cannot readily be removed by distillation, may be removed by treating the acid with nitric and sulphuric acids and then distilling. By this treatment, the acid may be recovered in a purified colorless form free of the foreign odor usually associated with acetic acid from a natural source. However, acetic acid which has been subjected to this treatment sometimes contains nitrous acid or a nitrite that distills therewith. We have further found that, when necessary, such nitrogenous impurity may be removed by destroying the nitrites in known manner, e. g. by treating the acid with ammonia or an organic derivative thereof.

In practicing the invention, crude acetic acid from a natural source, e. g. the distillation of wood, is first rectified to remove the impurities readily separable by distillation. The recovered acetic acid retains, of course, those impurities which distill therewith and is usually discolored and possesses a foreign odor. This distilled acetic acid, which may be anhydrous or in aqueous solution, depending upon whether or not it has been subjected to dehydration, may if desired be treated directly with nitric and sulphuric acids in accordance with this invention, since said acids, when properly used, are effective in removing all of the impurities usually present in the distilled acid. However, the bulk of the impurities in the distilled acid may be removed by the known methods hereinbefore mentioned, particularly by treatment with ammonia as described in U. S. Patent No. 2,126,211, and this preferably is done prior to the treatment with nitric and sulphuric acids in order to reduce the proportions of said inorganic acids required for complete purification.

The acetic acid, after such preliminary purification in known manner, is treated with small proportions of nitric and sulphuric acids, to remove the remaining impurities, particularly those lending a foreign odor to the acetic acid. The acetic acid subjected to this treatment may be anhydrous or aqueous as desired, but preferably contains not more than 40 per cent by weight of water. The acid is at least partially purified and deodorized regardless of the proportions of such acids used. The nitric and sulphuric acids are usually employed together in a single treatment, but they may, if desired, be used individually in consecutive treatments of the acetic acid. The proportions of nitric and sulphuric acids required for complete purification of the acetic acid vary somewhat, depending on the purity of the acetic acid when subjected to the treatment. In deodorizing a natural acetic acid which has already been rendered nearly pure by the known methods of treatment hereinbefore discussed, the proportion of concentrated nitric acid required is usually between 0.1 and 1 per cent of the anhydrous weight of the acetic acid and the proportion of concentrated sulphuric acid is between 0.5 and 2 per cent on the same basis. The nitric and sulphuric acids may, of course, be used in greater proportions, and their use in proportions greater than those just stated, e. g. up to 10 per cent or higher, may be required when the preliminary purification in known manner has been omitted or carried out inefficiently.

After adding the nitric and sulphuric acids to the acetic acid, as just described, the mixture is heated at atmospheric or elevated pressure preferably to a temperature between 100° and 200° C. until a portion of acetic acid isolated from the mixture is found to be free of odors other than that characteristic for pure acetic acid. The time of heating required may vary considerably, depending upon the proportions of nitric and sulphuric acids used, the concentration of the acetic acid subjected to the treatment, the temperature at which the treatment is carried out, etc. However, in the final purification of acetic acid from wood by heating the same with approximately 1 per cent by weight of each of the compounds concentrated nitric acid and concentrated sulphuric acid, approximately 5 hours of boiling under reflux at atmospheric pressure is usually required in order to effect satisfactory deodorization, but only 1 hour of heating is required when the operation is carried out under pressure in a bomb or autoclave at a temperature of 175° C.

Purified acetic acid may then be recovered from the mixture in any of several ways. In some instances, acetic acid of satisfactory purity may be distilled directly from the mixture, but the recovery of acetic acid is greatest when the inorganic acids in the mixture are neutralized prior to the distillation, and even though this be done the recovered acetic acid, as hereinbefore pointed out, usually contains nitrous acid or a nitrite.

In practice, the mixture obtained by heating the acetic acid with nitric and sulphuric acids is treated to neutralize the inorganic acids therein. This neutralization may be accompanied with any alkali, e. g. a hydroxide, carbonate, or bicarbonate of sodium, potassium or calcium, but it is preferably accomplished by adding an alkali metal acetate such as sodium or potassium acetate to the mixture. The acetic acid is then preferably, though not necessarily, distilled to separate it from the salts formed by the neutralization, after which it is treated to remove the nitrous acid or nitrite therein. As hereinbefore mentioned, the nitrous acid or nitrite may be removed by procedure well known for the destruction of nitrous acid, e. g. by treating the acetic acid with ammonia or an organic derivative thereof. The agent preferably used for this purpose is an aromatic amine, e. g. aniline, n-methyl aniline, n-dimethyl aniline, n-ethyl aniline, n-diethylaniline, naphthylamine, diphenylamine, etc., but other organic derivatives of ammonia such as methylamine, ethylamine, diethylamine, propylamine, dipropylamine, butylamine, piperidene, acetamide, n-methyl acetamide, n-ethyl propionamide, etc., can be used. In so far as we know, any aromatic amine, or any primary or secondary aliphatic amine or any acid amide having at least one hydrogen atom linked with its nitrogen can be used successfully in this operation.

The ammonia or ammonia derivative is of course used in a proportion sufficient to react with the nitrites in the acetic acid. When aniline is the purifying agent employed, it generally is used in a proportion representing about four-fifths of the weight of the nitric acid used in the preceding purification step. The treatment to remove nitrite from the acetic acid may be carried out at room temperature, but preferably is carried out by heating the mixture at temperatures between 50° and 150° C. for from 10 minutes to 0.5 hour. The acetic acid is then distilled from the mixture to obtain it in a purified form free from objectionable odors.

The following examples describe certain ways in which the principle of the invention has been applied, but are not to be construed as limiting the invention.

EXAMPLE 1

Anhydrous acetic acid (from the distillation of wood) which had been purified by rectification, but which was discolored, possessed an off-odor and retained impurities which distill with the acid, was treated with 0.5 per cent by weight of concentrated nitric acid and 1.5 per cent of concentrated sulphuric acid. The mixture was then heated in an autoclave at a temperature of 165° C. for 1 hour, after which the autoclave was cooled, opened and the mineral acids present were neutralized by adding about 3.1 per cent by weight of sodium acetate. The mixture was then filtered and distilled. The distillate was treated with 0.4 per cent by weight of aniline and then fractionally distilled. The following table gives the properties of the acetic acid before and after the treatment just described. In the table, the numbers used to express the color of the acetic acid accord with the American Public Health Association standards for color in water; e. g. a colorless condition corresponding to that of pure water is designated by a cipher, whereas colors of increasing depth are designated by numbers of increasing value. The "permanganate" test mentioned in the table is the U. S. Pharmacopoeia test for the presence of reducing agents and involves adding potassium permanganate to the material under test and observing whether or not the permanganate color is retained by the material on standing.

Table

| Acetic acid tested | Freezing point | Color APHA | Permanganate test | Odor |
|---|---|---|---|---|
| Before treatment | °C. 16.25 | 40 | KMnO⁴ decolorized in 1 min. | Pronounced off-odor. |
| After treatment | 16.5 | 0 | KMnO⁴ not decolorized after 2 hrs. | No foreign odor. |

EXAMPLE 2

Aqueous acetic acid of 95 per cent by weight concentration which was derived from the distillation of wood and which had been purified by distillation and by treatment with ammonia as described in U. S. Patent No. 2,126,611, was practically pure but nevertheless had a pronounced odor foreign to acetic acid. 290 grams of this acid was treated with 4.2 grams of concentrated sulphuric acid (specific gravity 1.84), 1.45 grams of concentrated nitric acid (specific gravity 1.42), and 15.3 grams of water and the mixture was boiled under reflux for 5 hours. Approximately 10 grams of anhydrous sodium acetate was then added and the mixture was cooled to 20° C. and filtered. The filtrate was then fractionally distilled, whereby acetic acid was recovered in a pure form free of foreign odors.

EXAMPLE 3

A mixture of 400 grams of an 80 per cent by weight concentrated acetic acid (which except for its concentration corresponded to the acid subjected to treatment in Example 2), 100 grams of water, 12.5 grams of concentrated sulphuric acid, and 9.7 grams of concentrated nitric acid, was boiled under reflux for 5 hours. Approximately 40 grams of anhydrous sodium acetate was then added and the mixture was cooled to 20° C. and filtered. The filtrate was fractionally distilled, whereby 65 per cent of the acetic acid was recovered in a pure condition free from foreign odors.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for purifying acetic acid from a natural source, the step of heating the acid with minor proportions of nitric acid and sulphuric acid and thereafter separating acetic acid from the resultant mixture.

2. In a method for purifying acetic acid from a natural source, the steps of heating the acid at temperatures between about 100° and about 200° C. with minor proportions of nitric acid and sulphuric acid and thereafter distilling to recover the acetic acid in purified condition.

3. In a method for purifying acetic acid from a natural source, the steps of heating the acid at temperatures between about 100° and about 200° C. with nitric acid and sulphuric acid, each in amount corresponding to less than 10 per cent of the anhydrous weight of the acetic acid, neutralizing the mineral acids and destroying nitrite in the mixture, and distilling acetic acid from the mixture.

4. In a method for purifying acetic acid from a natural source, the steps of heating the acid at temperatures between about 100° and about 200° C. with nitric and sulphuric acids, each in amount corresponding to less than 10 per cent of the anhydrous weight of the acetic acid, neutralizing the mineral acids in the mixture, distilling acetic acid from the mixture, destroying nitrite in the distillate, and distilling acetic acid from the mixture.

5. In a method for purifying acetic acid from a natural source, the steps of heating the acid at temperatures between about 100° and about 200° C. with nitric and sulphuric acids, each in amount corresponding to less than 10 per cent of the anhydrous weight by the acetic acid, adding an alkali metal acetate to neutralize the mineral acids present, adding a small proportion of an aromatic amine, and distilling the acetic acid.

6. In a method for purifying acetic acid from a natural source, the steps of heating the acid at temperatures between about 100° and about 200° C. with nitric and sulphuric acids, each in amount corresponding to less than 10 per cent of the anhydrous weight of the acetic acid, adding an alkali metal acetate to neutralize the mineral acids present, distilling acetic acid from the mixture, adding a small proportion of an aromatic amine, and distilling the acetic acid.

7. In a method for purifying acetic acid from a natural source, the steps of heating the acid at temperatures between about 100° and about 200° C. with nitric and sulphuric acids, each in amount corresponding to less than 10 per cent of the anhydrous weight of the acetic acid, adding sodium acetate to neutralize the mineral acids, distilling acetic acid from the mixture, adding aniline to the distillate and again distilling to separate acetic acid in purified form.

EDGAR C. BRITTON.
RALPH P. PERKINS.
ANDREW J. DIETZLER.